United States Patent
Nakanishi et al.

(10) Patent No.: US 10,503,673 B2
(45) Date of Patent: Dec. 10, 2019

(54) STORAGE SYSTEM AND METHOD OF STORAGE SYSTEM FOR CONSTRUCTING SYSTEM

(71) Applicant: HITACHI, LTD., Tokyo (JP)

(72) Inventors: Hidechika Nakanishi, Tokyo (JP); Tetsuya Inoue, Tokyo (JP)

(73) Assignee: Hitachi, Ltd., Tokyo (JP)

(*) Notice: Subject to any disclaimer, the term of this patent is extended or adjusted under 35 U.S.C. 154(b) by 0 days.

(21) Appl. No.: 16/083,067

(22) PCT Filed: Sep. 13, 2016

(86) PCT No.: PCT/JP2016/076889
§ 371 (c)(1),
(2) Date: Sep. 7, 2018

(87) PCT Pub. No.: WO2018/051386
PCT Pub. Date: Mar. 22, 2018

(65) Prior Publication Data
US 2019/0114270 A1 Apr. 18, 2019

(51) Int. Cl.
*G06F 13/16* (2006.01)
*G06F 13/40* (2006.01)
*G06F 13/42* (2006.01)

(52) U.S. Cl.
CPC ...... *G06F 13/1668* (2013.01); *G06F 13/4022* (2013.01); *G06F 13/4282* (2013.01); *G06F 2213/0026* (2013.01)

(58) Field of Classification Search
None
See application file for complete search history.

(56) References Cited

U.S. PATENT DOCUMENTS 5,450,570 A * 9/1995 Richek .................. G06F 9/4411
710/10
6,480,955 B1 * 11/2002 DeKoning ............ G06F 9/4411
709/220

(Continued)

FOREIGN PATENT DOCUMENTS

JP  2011-065551 A  3/2011

OTHER PUBLICATIONS

International Search Report of PCT/JP2016/076889 dated Nov. 1, 2016.

*Primary Examiner* — Michael Sun
(74) *Attorney, Agent, or Firm* — Mattingly & Malur, PC

(57) ABSTRACT

Each of one or more storage device units has a switch device for relaying communication in accordance with a communication interface in which the number of master devices that can exist in the same domain is defined and having a plurality of switch ports. A controller unit has a storage controller having a plurality of initiator ports. A storage controller acquires, via each of the plurality of initiator ports, the ID of a storage device unit connected to the initiator port. The storage controller determines a system configuration on the basis of a port ID relationship between the plurality of initiator ports and the plurality of acquired IDs. The storage controller performs switch setting, for each of the one or more switch devices, that corresponds to the determined system configuration, via at least one initiator port connected to the switch device.

8 Claims, 9 Drawing Sheets

(56) References Cited

U.S. PATENT DOCUMENTS

| | | | |
|---|---|---|---|
| 7,334,164 B2* | 2/2008 | Baba | G06F 11/1666 |
| | | | 714/42 |
| 7,461,194 B2 | 12/2008 | Ohara | |
| 2004/0054776 A1* | 3/2004 | Klotz | H04L 41/06 |
| | | | 709/224 |
| 2004/0081186 A1* | 4/2004 | Warren | H04L 12/433 |
| | | | 370/419 |
| 2004/0085994 A1* | 5/2004 | Warren | H04L 12/433 |
| | | | 370/462 |
| 2008/0189499 A1* | 8/2008 | Ogata | G06F 3/0617 |
| | | | 711/162 |
| 2009/0043959 A1* | 2/2009 | Yamamoto | G06F 3/0608 |
| | | | 711/112 |
| 2011/0060878 A1* | 3/2011 | Kaneko | G06F 3/061 |
| | | | 711/114 |
| 2012/0179804 A1* | 7/2012 | Katanp | G06F 13/4022 |
| | | | 709/223 |
| 2013/0297903 A1* | 11/2013 | Kaneko | G06F 3/0605 |
| | | | 711/165 |
| 2014/0351545 A1* | 11/2014 | Nakajima | G06F 3/0607 |
| | | | 711/170 |

* cited by examiner

| MP Module # | 10A | | | | | | | | 10B | | | | | | | |
|---|---|---|---|---|---|---|---|---|---|---|---|---|---|---|---|---|
| I/O Module # | 7A1 | | 7A2 | | 7A3 | | 7A4 | | 7B1 | | 7B2 | | 7B3 | | 7B4 | |
| Port# | A1 | B1 | C1 | D1 | E1 | F1 | G1 | H1 | A2 | B2 | C2 | D2 | E2 | F2 | G2 | H2 |

FIG. 4

| Port# | Case 1 | | |
|---|---|---|---|
| | Product number | Issue Flag | Configuration |
| A1 | 0123 | 1 | Configuration 1 |
| B1 | 0123 | 0 | |
| C1 | 0123 | 0 | |
| D1 | 0123 | 0 | |
| E1 | 0123 | 0 | |
| F1 | 0123 | 0 | |
| G1 | 0123 | 0 | |
| H1 | 0123 | 0 | |

113A

| Port# | Case 2 | | |
|---|---|---|---|
| | Product number | Issue Flag | Configuration |
| A1 | 0123 | 1 | Configuration 2 |
| B1 | 0123 | 0 | |
| C1 | 0123 | 0 | |
| D1 | 0123 | 0 | |
| E1 | 4567 | 1 | Configuration 2 |
| F1 | 4567 | 0 | |
| G1 | 4567 | 0 | |
| H1 | 4567 | 0 | |

113A

| Port# | Case 3 | | |
|---|---|---|---|
| | Product number | Issue Flag | Configuration |
| A1 | 0123 | 1 | Configuration 3 |
| B1 | 0123 | 0 | |
| C1 | 4567 | 1 | Configuration 3 |
| D1 | 4567 | 0 | |
| E1 | 89AB | 1 | Configuration 3 |
| F1 | 89AB | 0 | |
| G1 | CDEF | 1 | Configuration 3 |
| H1 | CDEF | 0 | |

113A

| Port# | Case 4 | | |
|---|---|---|---|
| | Product number | Issue Flag | Configuration |
| A1 | 0123 | 1 | Configuration 4 |
| B1 | 4567 | 1 | Configuration 4 |
| C1 | 89AB | 1 | Configuration 4 |
| D1 | CDEF | 1 | Configuration 4 |
| E1 | 1234 | 1 | Configuration 4 |
| F1 | 5678 | 1 | Configuration 4 |
| G1 | 9ABC | 1 | Configuration 4 |
| H1 | DEF0 | 1 | Configuration 4 |

113A

STORAGE SYSTEM AND METHOD OF STORAGE SYSTEM FOR CONSTRUCTING SYSTEM

TECHNICAL FIELD

The present invention relates generally to system construction for a storage system.

BACKGROUND ART

A known storage system includes one controller box and one or more PDEV boxes each having a PCI-Express (PCIe) switch device. The controller box has a storage controller. The PDEV box has the PCI-Express (PCIe) switch device and a plurality of PDEVs connected to this PCIe switch device. In a storage system of this type, a controller box (storage controller) is connected to at least one PDEV box (PCIe switch device). The PDEV is a non-volatile physical storage device and, for example, is a hard disk drive (HDD) or a solid state drive (SSD). The PCIe switch device is a device that includes a switch function for relaying communications in accordance with an interface called PCIe. The storage controller accesses an access destination PDEV via a PCIe switch device to which this PDEV is connected.

Each PCIe switch device has a plurality of ports. The ports that the PCIe switch device has is hereinafter referred to as "SW port." The SW ports include downstream ports (DSPs) connected to lower-level devices (here, lowerlevel switch devices) and upstream ports (USPs) connected to higher-level devices (here, higher-level switch devices or storage controller). The DSP is a port whose attribute is "downstream." The USP is a port whose attribute is "upstream."

As a known technique for setting the attributes of the SW ports, the technique disclosed in PTL 1 may be mentioned. According to PTL 1, a plurality of central processing unit (CPU) nodes are connected to each switch node (PCI switch device). A controller in the switch node defines any one of the SW ports to which the CPU node is connected as USP and defines the other SW ports as DSPs.

CITATION LIST

Patent Literature

[PTL 1] U.S. Pat. No. 7,461,194

SUMMARY OF INVENTION

Technical Problem

Multiple system configurations (configurations of a storage system) may be considered.

For example, with the technological progress of PDEV, it is expected that a smaller number of PDEV boxes can bring out the maximum performance of a storage system. As a result, for example, it may be considered that only one PDEV box is adopted, in other words, a system configuration may be considered in which all of initiator ports of a storage controller are connected to one PCIe switch. According to this system configuration, a space-saving and high-performance storage system can be expected.

In addition, for example, a system configuration may be considered in which a plurality of PDEVs constituting the same RAID (Redundant Array of Independent (or Inexpensive) Disks) group are provided in a distributed manner in a plurality of PDEV boxes. In this case, it is possible to expect a storage system having at least either of enhanced redundancy and enlarged capacity.

When a PCIe switch device is adopted as a switch device that relays communications between the storage controller and the PDEV, PCIe switch devices that are suited to the system configurations need to be provided for each system configuration. This is because the PCIe standard exists which requires that only one root complex (RC) (should) exist in one domain. The RC is an example of a master device. The initiator port of the storage controller is an example of the RC. When each of the initiator ports is connected to one PCIe device, domains (partitions) need to be provided on a per-initiator-port basis.

The number of the initiator ports connected to one PCIe switch device, in other words, the number of the USPs that one PCIe switch device has depends on the system configurations. It is necessary to provide PCIe switch devices in accordance with the system configurations. For example, in view of achieving a space-saving and high-performance storage system, the PDEV box needs to include connectors by the number equal to that of the ports which is in turn equal to the number of the initiator ports that the storage controller has. Meanwhile, in view of achieving a storage system that has at least either of enhanced redundancy and enlarged capacity, the PDEV box needs to include connectors by the number equal to that of the ports which is in turn equal to the number of the initiator ports connected to this PDEV box among the initiator ports that the storage controller has.

Hence, it is preferable that one PCIe switch device can be used in any one of multiple system configurations, in other words, the PCIe switch device has versatility.

However, even when the techniques disclosed in PTL 1 are used, it is not possible to configure one PCIe switch device such that it can be used in any one of multiple system configurations. This is because the number of the USPs in on switch node is maintained as 1 according to PTL 1.

Issues of this sort is not specific to a PCIe switch device and can be found in switch devices in general which relay communications in accordance with a communication interface that specifies the number of master devices that can exist in the same domain.

Solution to Problem

A storage system includes one or more storage device units (e.g., PDEV boxes) and a controller unit (e.g., controller box). Each of the one or more storage device units has one or more storage devices and a switch device including a plurality of switch ports including one or more switch ports each connected to the one or more storage devices. The switch device is a device configured to relay communications in accordance with a communication interface that specifies the number of master devices that can exist in the same domain. The controller unit has a plurality of initiator ports and a storage controller having a plurality of initiator ports. One or more switch devices in the one or more storage device units are connected to the initiator ports. The storage controller acquires an ID of the storage device unit connected to the initiator port via each of the initiator ports. The storage controller determines the system configuration on the basis of a port ID relationship which is a relationship between the initiator ports and a plurality of the IDs that have been acquired. The storage controller performs switch setting for each of the one or more switch device connected to the initiator ports, via at least one initiator port connected to the switch device, where the switch setting being made in accordance with the system configuration that has been determined.

Advantageous Effects of Invention

It is made possible to allow one switch device relaying communications in accordance with a communication interface that specifies the number of master devices that can exist in the same domain to be used in any one of multiple system configurations.

BRIEF DESCRIPTION OF DRAWINGS

FIG. 4 illustrates product number storage tables each corresponding to corresponding one of the configurations 1 to 4.

DESCRIPTION OF EMBODIMENTS

Figure 1:
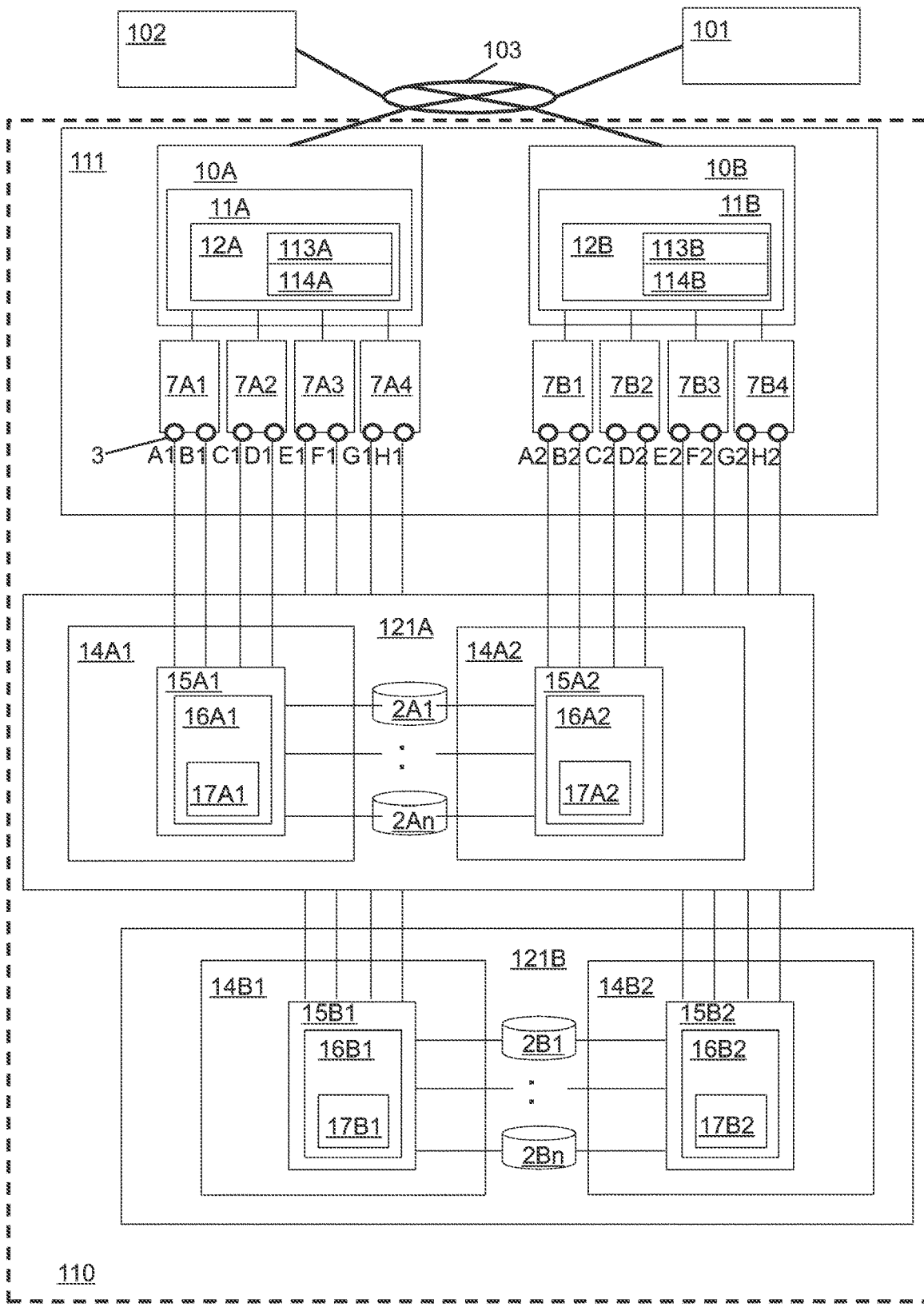
FIG. 1 illustrates an example of a configuration of a computer system according to an embodiment.

An embodiment will be described below.

While information may be explained using an expression such as "xxx table" in following explanations, information may be expressed by any appropriate data structure. Specifically, in order to indicate that information does not depend on a data structure, "xxx table" may be referred to as "xxx information." Also, in the following explanations, the configuration of each table is merely an example and one table may be divided into two or more tables and all or part of two or more tables may constitute one table.

Also, in the following explanations, while a "program" may appear as a grammatical subject to describe processing, a "program" carries out predetermined processing by being executed by a processor (e.g., a central processing unit (CPU)) and by using a storage unit (e.g., a memory) and/or an interface device (e.g., a communication port) and the like as appropriate, so that the grammatical subject of the processing may be a processor (or a device or system incorporating the same processor). In addition, a processor may include a hardware circuit that carries out all or part of the processing. A program may be installed on a device such as a computer from a program source. The program source may be, for example, a (non-transitory, for example) recording medium that can be read by a program distribution server or a computer. In addition, in the following explanations, two or more programs may be implemented as one program and one program may be implemented as two or more programs.

In addition, in the following explanations, a "host system" may be one or more physical host computers (e.g., a cluster of host computers) and may include at least one virtual host computer (e.g., a virtual machine (VM)). The host system will be hereinafter simply referred to as a "host."

Also, in the following explanations, a "storage system" may be one or more physical storage devices or may include at least one virtual storage device (e.g., software defined storage (SDS)).

In addition, in the following explanations, "PDEV" refers to a physical storage device and typically is a non-volatile storage device (e.g., auxiliary storage device). A PDEV is, for example, an HDD or an SSD.

Also, in the following explanations, "RAID group" may be a group that is constituted by multiple PDEVs and configured to store data in accordance with an associated RAID level (RAID configuration) and may be a group that is constituted by a plurality of storage areas based on multiple PDEVs and stores data in accordance with an associated RAID level (RAID configuration).

In addition, in the following explanations, the reference signs (or the common portions of the reference signs) may be used when the components of the same type are described without particular distinction, and the IDs of the components (or the reference sings of the components) may be used when components of the same type are described with particular distinction.

Further, while the following explanations use numbers as identifiers of components, signs of other types may be used in place of or in addition to the numbers.

FIG. 1 illustrates an example of a configuration of a computer system according to an embodiment.

The computer system has one or more hosts 102, a storage system 110, and a management system 101. The host 102 and the management system 101, and the storage system 110 are coupled to the communication network 103. A communication network between the host 102 and the storage system 110 may be different than the communication network between the management system 101 and the storage system 1105. For example, the former may be a storage area network (SAN) and the latter may be a local area network (LAN).

The host 102 transmits an input/output (I/O) request to the storage system 110. The I/O request includes I/O destination information indicative of a location of an I/O destination. The I/O destination information includes, for example, a logical unit number (LUN) of a logical unit (LU) of the I/O destination and a logical block address (LBA) of an area in the LU. The LU is a logical volume (a logical storage device) provided from the storage system 110. Based on the I/O destination information, the logical area of the I/O destination is identified and the PDEV (drive) 2 based on the logical area is identified.

The management system 101 is one or more computers that manage the storage system 110. The management system 101 is, for example, a terminal for maintenance of the storage system 110 (service processor (SVP)).

The storage system 110 includes a controller box 111 and one or more PDEV boxes 121. In the illustrated example, two PDEV boxes 121A and 121B are connected to the controller box 111. Duplexed storage controllers 10 (10A and 10B) are stored in the controller box 111. Duplexed switch modules 14 and a plurality of (or one) PDEVs 2 connected to both of the duplexed switch modules 14 are stored in the PDEV box 121.

In the explanations of this embodiment, the reference signs of the constituent components in the storage controller 10x (where x indicates an uppercase alphabetical letter such as A, B, etc.) include "x." In addition, the reference signs of the constituent components in the PDEV box 121y (where y is an uppercase alphabetical letter such as A, B, etc.) include "y." In addition, the reference signs of the constituent components in the switch module 14yn (where y is an uppercase alphabetical letter such as A, B, etc.; and n is a natural number such as 1, 2, etc.) include "yn."

The configurations of the switch module 14 will be described with the switch module 14A1 taken as an example.

The switch module 14A1 includes a PCIe switch device 15A1. The PCIe switch device 15A1 has a plurality of SW ports and a memory 16A1. The memory 16A1 stores a configuration table 17A1. The configuration table 17A1 includes, with regard to each of the multiple SW ports that the PCIe switch device 15A1 has, pieces of information indicative of port attributes and device IDs (e.g., addresses) connected to the corresponding SW ports. The devices connected to the SW ports are at least one of the later-described initiator port 3, the PDEV 2, and another PCIe switch. In addition, the memory 16A1 stores a product number (an example of the ID (identification information)) of the PDEV box 121A including the switch module 14A1.

The configuration of the storage controller 10 will now be described with the storage controller 10A taken as an example.

The storage controller 10A has an MP module 11A. In addition, a plurality of (or one) I/O modules 7A are connected to the storage controller 10A.

The MP module 11 has a micro processor (MP) (not shown) which is an example of the processor and a memory 12A. The memory 12A stores the product number storage table 113A and the switch setting management table 114A. The product number storage table 113A stores the product numbers acquired from the individual PDEV boxes 121. The switch setting management table 114A stores the switch setting information (information indicative of the switch configuration) acquired from the individual PCIe switch devices 15.

The I/O module 7A is an example of the interface device of the storage controller 10A. The I/O module 7A has a plurality of (or one) initiator ports 3.

An example of the operation of the storage controller 10A is as follows. Specifically, the storage controller 10A processes the I/O request that has been received from the host 102. Specifically, for example, the storage controller 10A identifies the PDEV 2 acting as the I/O destination of the data on the basis of the I/O destination of this I/O request and transmits an I/O command to the PDEV 2 that has been identified. The storage controller 10A caches the data written to or read from the PDEV 2 into the memory 12 in accordance with the I/O request.

Figures 2, 3:
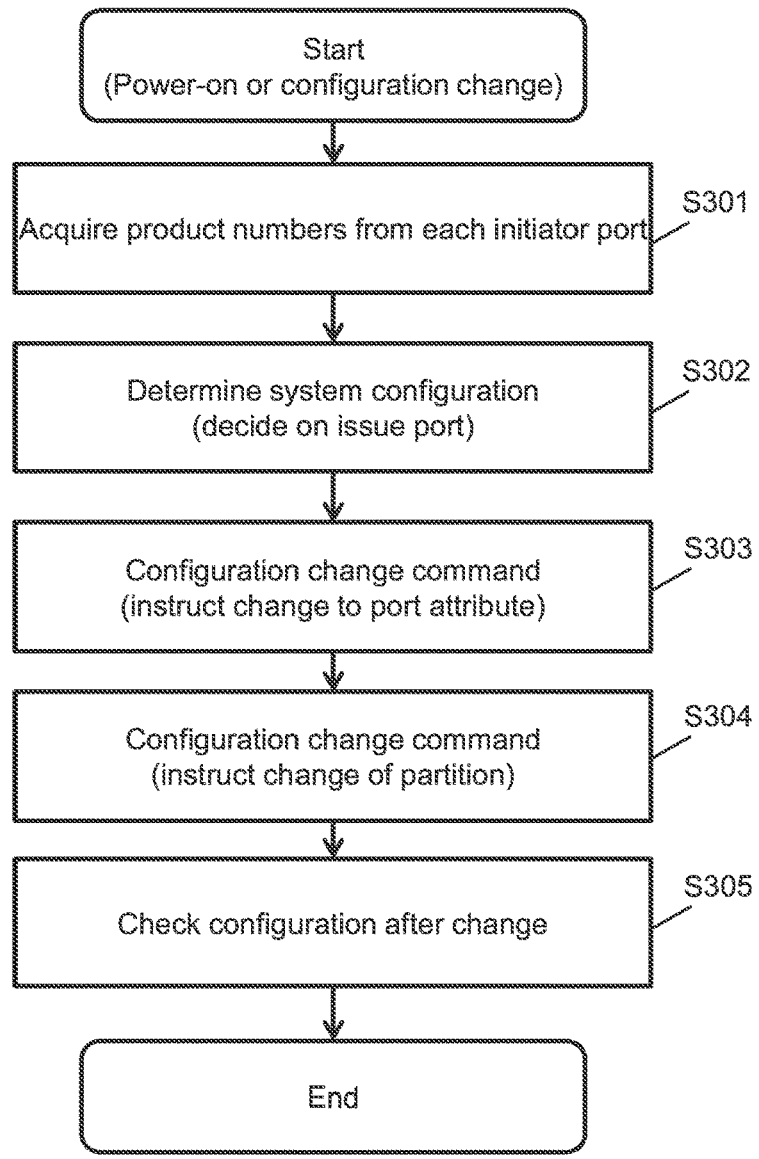
FIG. 2 illustrates relationships among MP modules, I/O modules, and initiator ports.
FIG. 3 illustrates a flow of a system construction process.

FIG. 2 illustrates the relationships among the MP modules 11, I/O modules 7, and initiator ports 3. In the example of FIG. 2, as the MP module # (number), reference sings of the MP modules 11 are adopted, as the I/O module (number), the reference sings of the I/O modules 7 are adopted, and, as the port # (number), the IDs of the initiator ports 3 are adopted.

According to FIG. 2 (and FIG. 1), it will be appreciated as follows.

Specifically, the MP module 11A has four I/O modules 7A1, 7A2, 7A3, and 7A4. Each of the four I/O modules 7A1 to 7A4 has two initiator ports 3, as a result of which the four I/O modules 7A1 to 7A4 have eight initiator ports A1, B1, C1, D1, E1, F1, G1, and H1.

Likewise, an MP module 11B has four I/O modules 7B1, 7B2, 7B3, and 7B4. Each of the four I/O modules 7B1 to 7B4 has two initiator ports 3, as a result of which the four I/O modules 7B1 to 7B4 have eight initiator ports A2, B2, C2, D2, E2, F2, G2, and H2.

The processing carried out in accordance with this embodiment will be described below.

FIG. 3 illustrates a flow of a system construction process. This process is started in at least one case out of: a case where the power of the storage system 110 (e.g., controller box 111) is turned on and a case where a change to the system configuration (e.g., addition or deletion of the PDEV box 121) has been detected by the storage controller 10. The following is based on a storage controller 10A as example of the storage controller 10. The storage controller 10B carries out the same or similar processing as that of the storage controller 10A.

The storage controller 10A acquires, from each of the initiator ports A1, B1, C1, D1, E1, F1, G1, and H1, the product number of the PDEV box 121 connected to the corresponding initiator port and updates the product number storage table 113A (S301). Specifically, for example, the storage controller 10A performs the following processing on each of the initiator ports A1, B1, C1, D1, E1, F1, G1, and H1. Specifically, the storage controller 10A transmits a product number query from the initiator port. This product number query is received by a PCIe switch device 15A connected to this initiator port. The PCIe switch device 15A returns, in response to this product number query, a response that includes the product number stored in the memory 16A1 (the product number of the PDEV box 121 that this PCIe switch device 15A has). The storage controller 10A receives the response including the product number via the initiator port acting as the transmission source of the product number query. The storage controller 10A stores the product number included in the received response in a corresponding field in the product number storage table 113A (the field corresponding to this transmission-source initiator port). Note that the product number storage table 113A is as illustrated in FIG. 4. Specifically, pieces of information such as "product number," "issue flag," and "system configuration" are associated with each of the initiator ports A1, B1, C1, D1, E1, F1, G1, and H1. The "product number" indicates the product number that has been acquired. As a result of S301, the "product number" is stored for each of the initiator ports A1, B1, C1, D1, E1, F1, G1, and H1. The "issue flag" and the "system configuration" will be stored as a result of S302 that follows. The "issue flag" indicates whether or not the corresponding initiator port is an issue port (a port acting as an issuer of the configuration change command). "1" represents an issue port. "System configuration" represents the system configuration that has been determined in the subsequent the S302 from among multiple system configurations.

The storage controller 10A determines the system configuration on the basis of the port product number relationship (the relationship between the initiator ports A1, B1, C1, D1, E1, F1, G1, and H1 and the product numbers) and decides on the issue port on the basis of the system configuration that has been determined (S302). The "system configuration" as used herein corresponds to the connection configuration regarding which PDEV box is connected to which initiator port. Some specific examples will be described below with reference to FIGS. 4 to 10.

Figure 5:
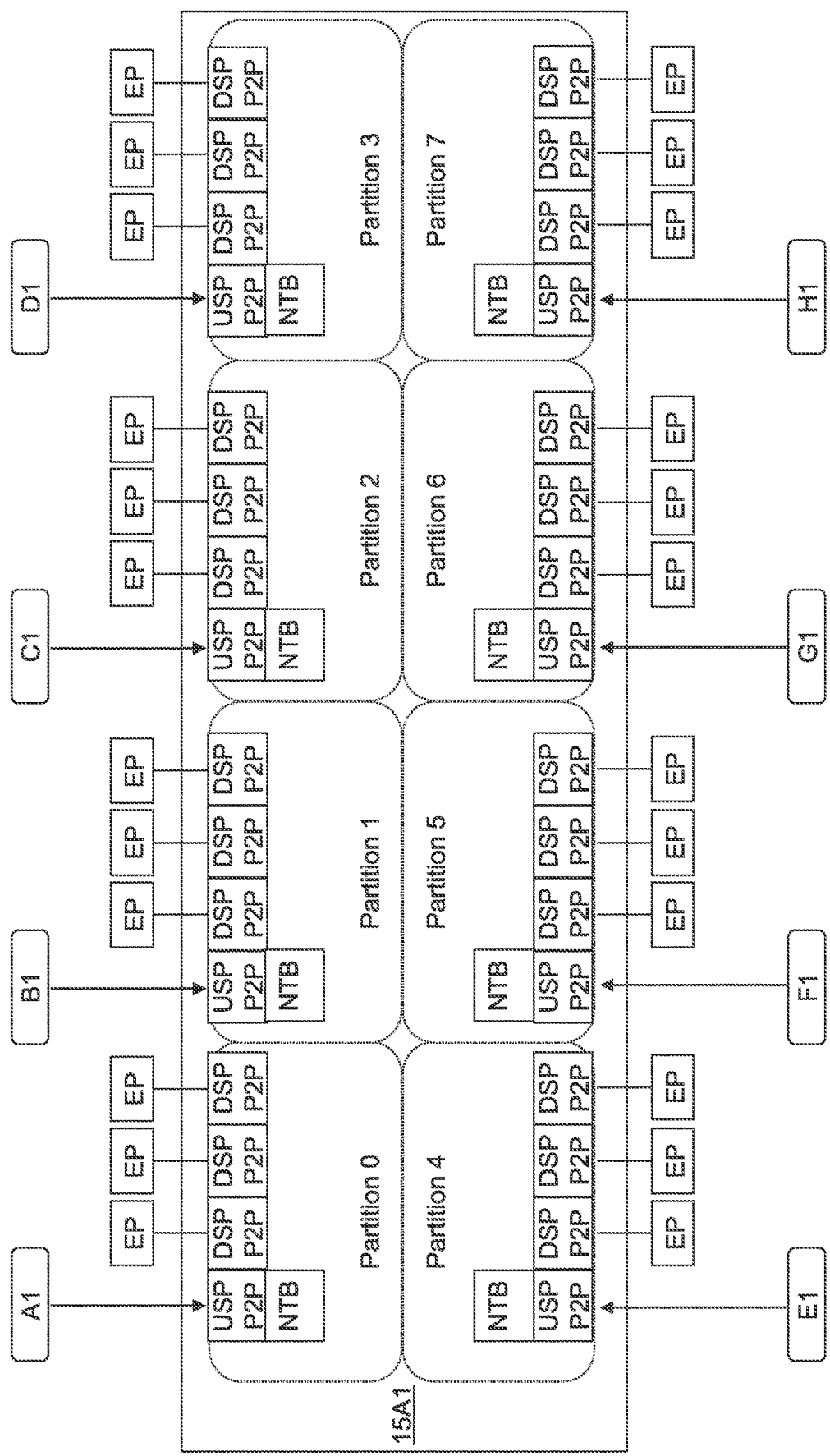
FIG. 5 illustrates a switch setting corresponding to the configuration 1 (setting for a PCIe switch device).

As a first example, it is assumed here that the port product number relationship is the relationship illustrated by the first product number storage table 113A in FIG. 4 (first relationship). According to the first relationship, the product numbers corresponding to the eight initiator ports A1, B1, C1, D1, E1, F1, G1, and H1, respectively, are identical with each other. As a result, according to the first relationship, the initiator ports A1, B1, C1, D1, E1, F1, G1, and H1 are all connected to the PDEV box 121. The system configuration in accordance with the first relationship is referred to, for convenience sake, as "configuration 1." The system configuration in FIG. 9 corresponds to the configuration 1. The storage controller 10A, if the port product number relationship is the first relationship, determines the configuration 1 as the system configuration. The storage controller 10A stores, for each of the initiator ports A1, B1, C1, D1, E1, F1, G1, and H1, the "configuration 1" as the "system configuration" in the product number storage table 113A. According to the configuration 1, as illustrated in FIG. 5, eight initiator ports (A1, B1, C1, D1, E1, F1, G1, and H1) are connected to one PCIe switch device (15A1). Hence, it suffices that one of the eight initiator ports is the issue port. Although two or more issue ports may exist, when one issue port exists, it is made possible to further simplify the processing of the storage controller 10A. Here, the storage controller 10A decides on the issue port as the initiator port A1 and updates the "issue flag" to "1" for the initiator port A1. As a result, the first product number storage table 113A illustrated in FIG. 4 is constructed. Note that NTB in FIG. 4 stands for Non-Transparent Bridge, EP stands for End Point, and P2P stands for Point to Point. In this embodiment, it is typically a PDEV. By virtue of the presence of the NTB, a PDEV (EP) that belongs to a domain different than the domain to which the initiator port (RC) belongs can be accessed via this initiator port.

Figure 6:
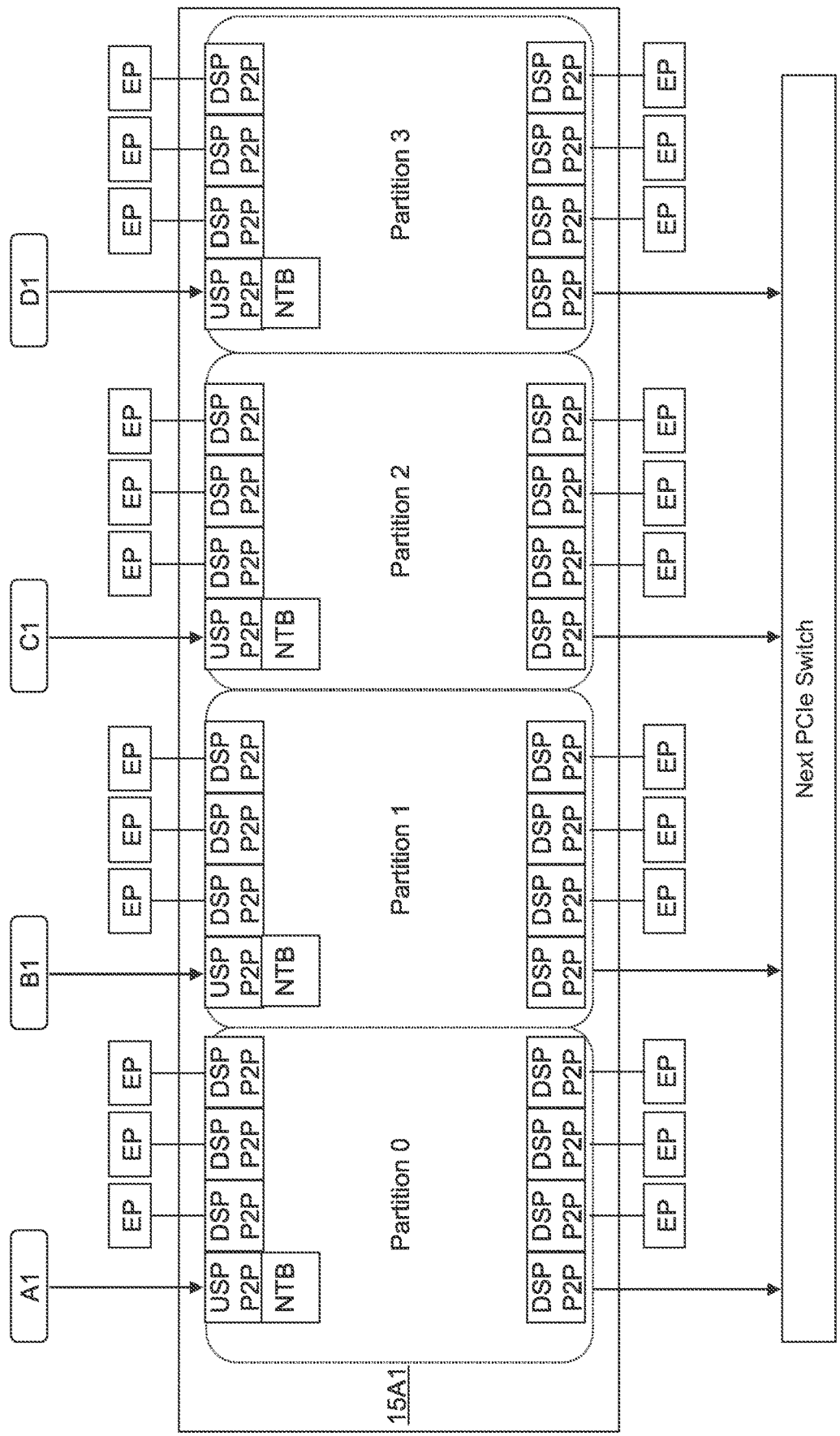
FIG. 6 illustrates a switch setting corresponding to the configuration 2.

As a second example, it is assumed here that the port product number relationship is the relationship (second relationship) illustrated by the second product number storage table 113A in FIG. 4. According to the second relationship, the product numbers corresponding to the four initiator ports A1, B1, C1, and D1 are identical with each other while the product numbers corresponding to the remaining four initiator ports E1, F1, G1, and H1, respectively, are identical with each other. As a result, according to the second relationship, the initiator ports A1, B1, C1, and D1 are connected to the first PDEV box 121A and the initiator ports E1, F1, G1, and H1 are connected to the second PDEV box 121B. The system configuration in accordance with the second relationship is referred to, for convenience sake, as "configuration 2." The system configuration illustrated in FIG. 1 corresponds to the configuration 2. The storage controller 10A, if the port product number relationship is the second relationship, determines the configuration 2 as the system configuration. The storage controller 10A stores, for each of the initiator ports A1, B1, C1, D1, E1, F1, G1, and H1, the "configuration 2." According to the configuration 2, as illustrated in FIG. 6, four initiator ports (A1, B1, C1, and D1) are connected to one PCIe switch device (15A1). Hence, it suffices that one of the four initiator ports is the issue port. Here, the storage controller 10A decides on the initiator port A1 as the issue port from among the four initiator ports A1, B1, C1, and D1 and decides on the initiator port E1 as the issue port from among the remaining four initiator ports E1, F1, G1, and H1. The storage controller 10A updates the "issue flag" to "1" for each of the initiator ports A1 and E1. As a result, second product number storage table 113A illustrated in FIG. 4 is constructed.

Figure 7:
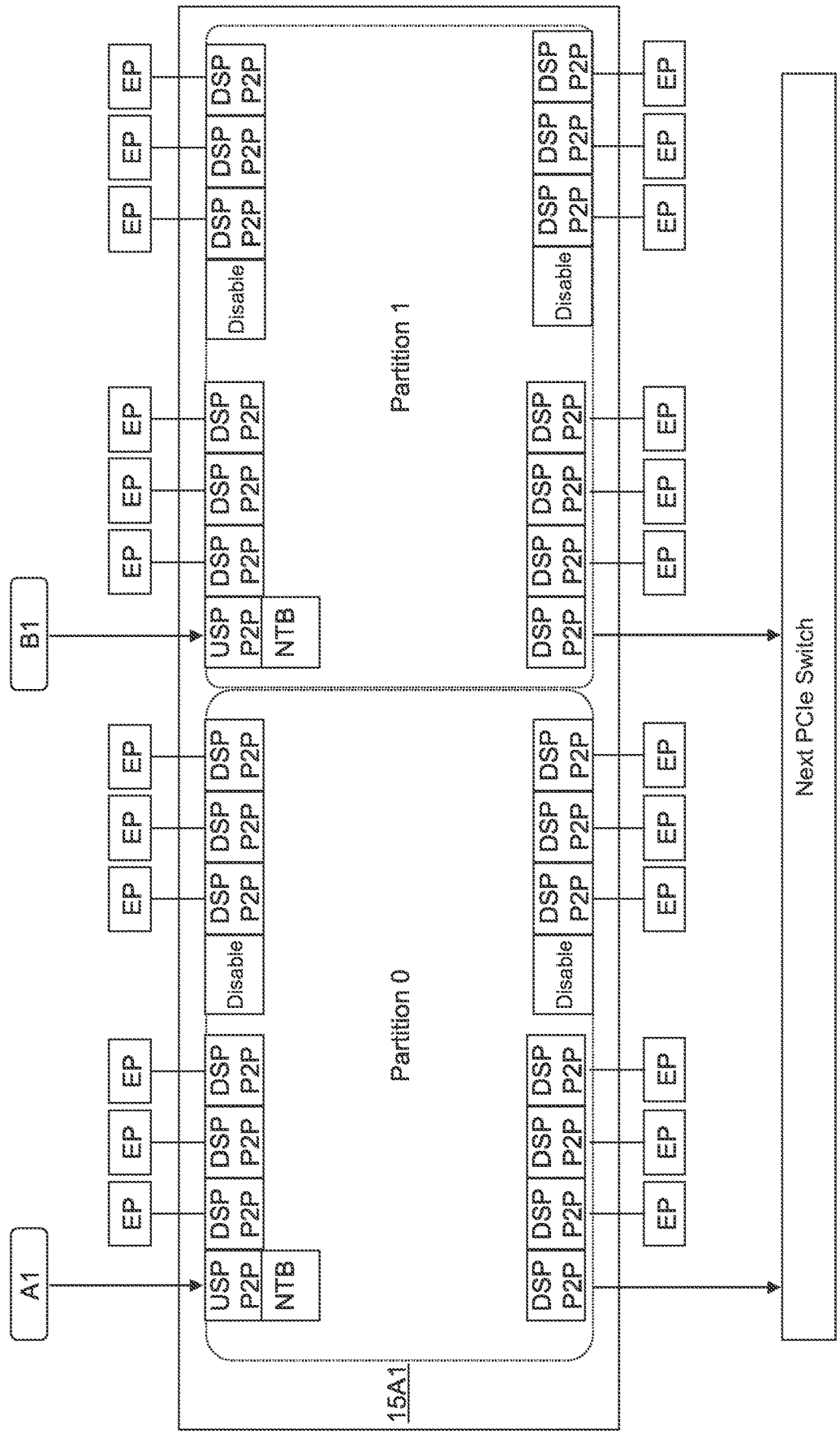
FIG. 7 illustrates a switch setting corresponding to the configuration 3.

As a third example, it is assumed here that the port product number relationship is the relationship illustrated by the third product number storage table 113A in FIG. 4 (third relationship). According to the third relationship, the product numbers corresponding to two initiator ports A1 and B1, respectively, are identical with each other, the product numbers corresponding to another two initiator ports C1 and D1, respectively, are identical with each other, the product numbers corresponding to still another two initiator port E1 and F1, respectively, are identical with each other, and the product numbers corresponding to the product numbers corresponding to the remaining two initiator port G1 and H1, respectively, are identical with each other. As a result, according to the third relationship, the initiator ports A1 and B1 are connected to the first PDEV box 121A, the initiator ports C1 and D1 are connected to the second PDEV box 121B, the initiator ports E1 and F1 are connected to a third PDEV box 121C, and the initiator ports G1 and H1 are connected to a fourth PDEV box 121D. The system configuration in accordance with the third relationship is referred to, for convenience sake, as "configuration 3." The system configuration illustrated in FIG. 10 corresponds to the configuration 3. The storage controller 10A, if the port product number relationship is the third relationship, determines the configuration 3 as the system configuration. The storage controller 10A stores, for each of the initiator ports A1, B1, C1, D1, E1, F1, G1, and H1, the "configuration 3." According to the configuration 3, as illustrated in FIG. 7, two initiator ports (A1 and B1) are connected to one PCIe switch device (15A1). Hence, it suffices that one of the two initiator ports is the issue port. Here, the storage controller 10A decides on the initiator port A1 as the issue port out of the two initiator ports A1 and B1, decides on the initiator port C1 as the issue port out of the two initiator ports C1 and D1, decides on the initiator port E1 as the issue port out of the two initiator ports E1 and F1, and decides on initiator port G1 as the issue port out of the two initiator ports G1 and H1. The storage controller 10A updates the "issue flag" to "1" for each of the initiator ports A1, C1, E1 and G1. As a result, the third product number storage table 113A illustrated in FIG. 4 is constructed.

Figure 8:
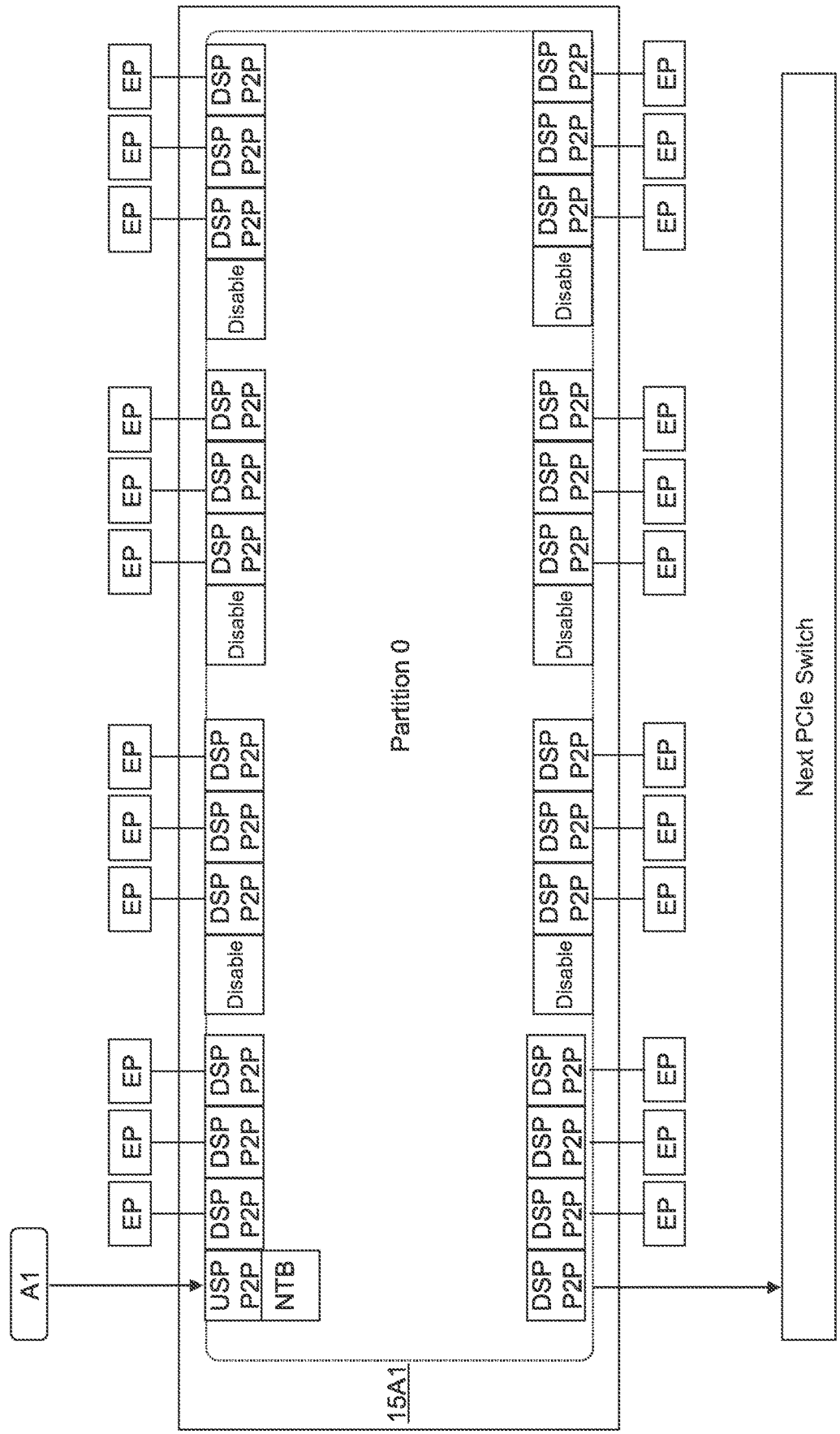
FIG. 8 illustrates a switch setting corresponding to the configuration 4.
Figure 9:
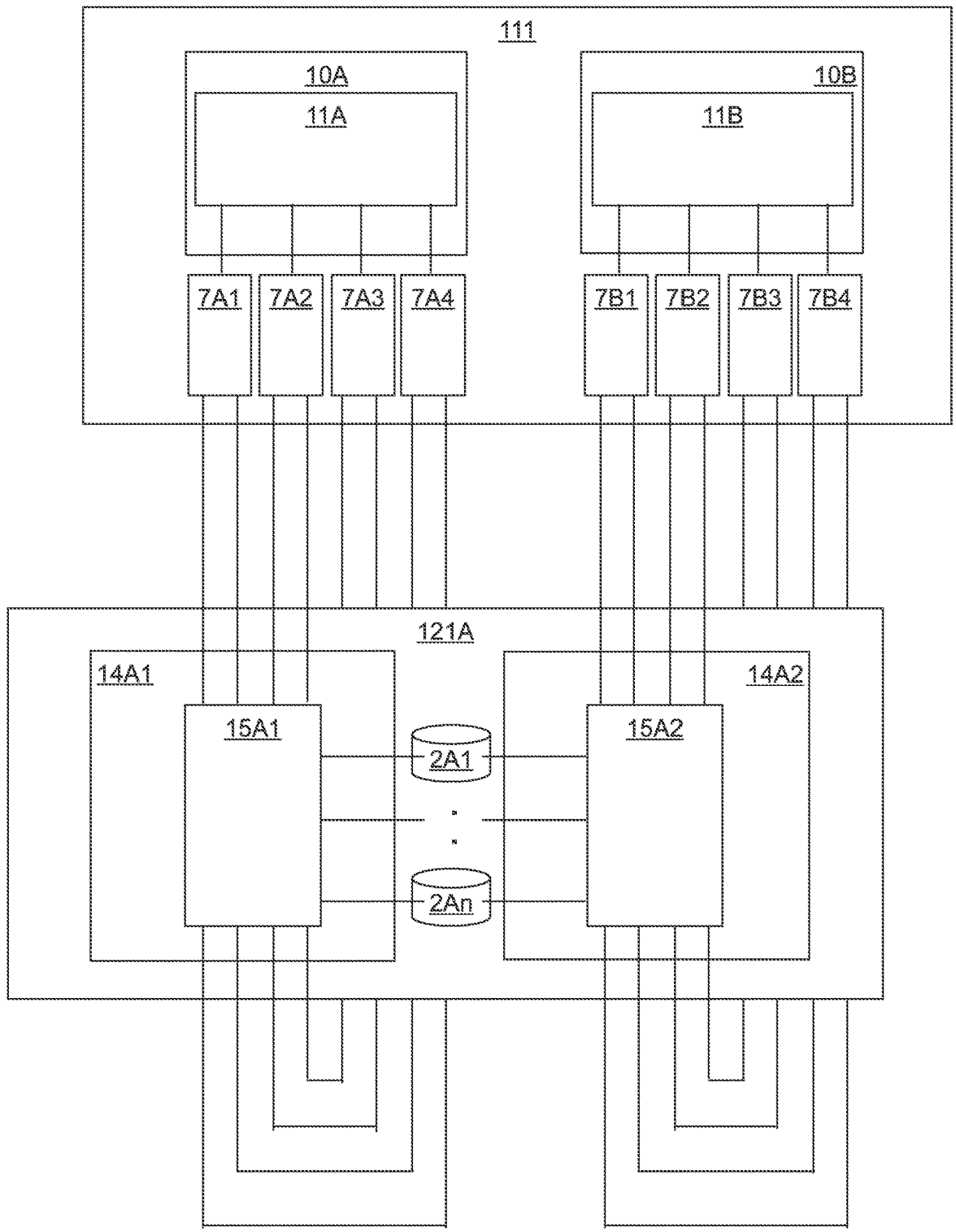
FIG. 9 illustrates a system configuration corresponding to the configuration 1.
Figure 10:
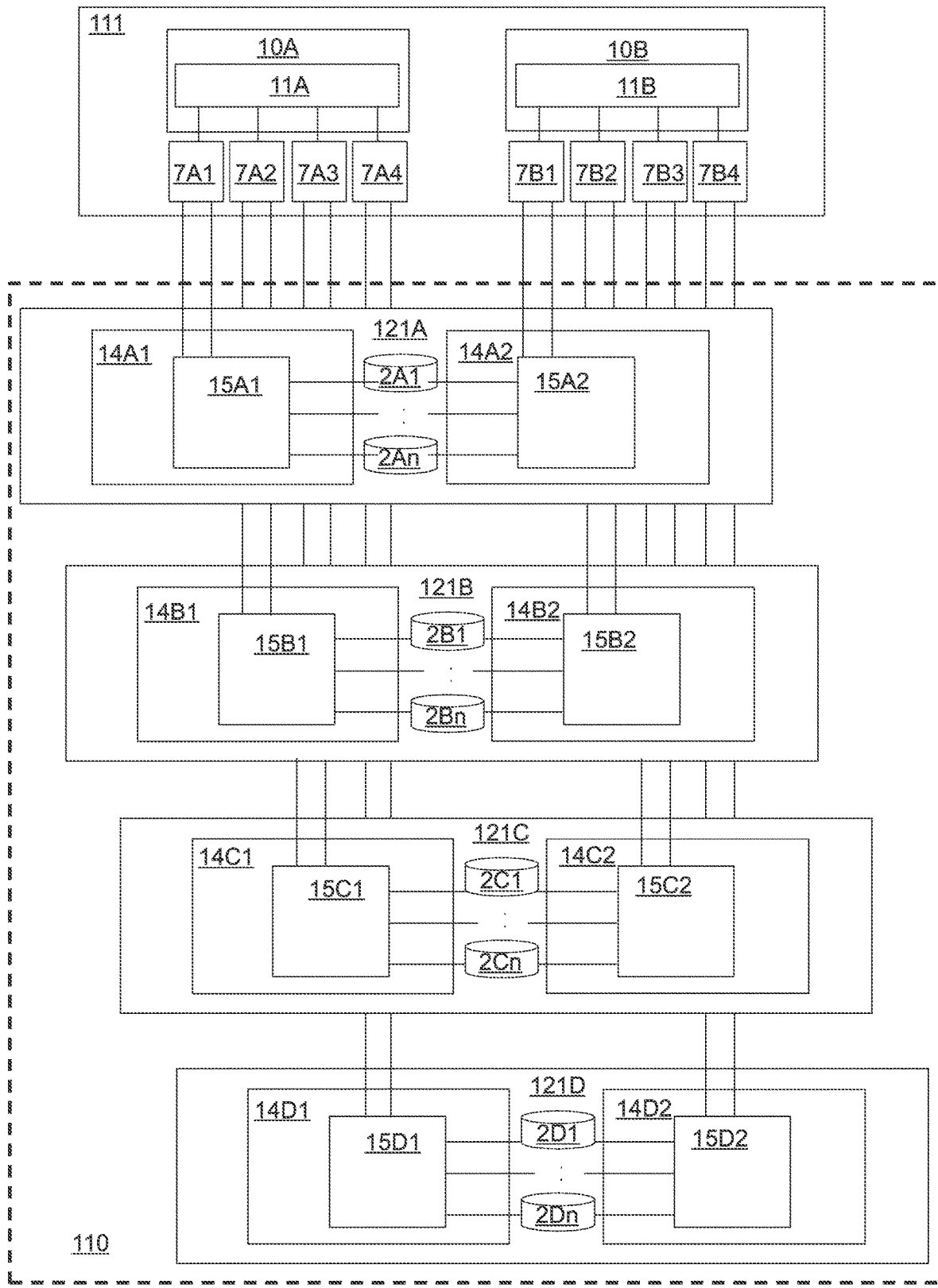
FIG. 10 illustrates a system configuration corresponding to the configuration 3.

As a fourth example, it is assumed here that the port product number relationship is the relationship illustrated by the fourth product number storage table 113A in FIG. 4 (fourth relationship). According to the fourth relationship, the product numbers corresponding to eight initiator ports A1, B1, C1, D1, E1, F1, G1, and H1 are all different from each other. As a result, according to the fourth relationship, eight initiator ports A1, B1, C1, D1, E1, F1, G1, and H1 are connected to eight PDEV boxes 121A, respectively. The system configuration in accordance with the fourth relationship is referred to, for convenience sake, as "configuration 4." The storage controller 10A, if the port product number relationship is the fourth relationship, determines the configuration 4 as the system configuration. The storage controller 10A stores, for each of the initiator ports A1, B1, C1, D1, E1, F1, G1, and H1, the "configuration 4." According to the configuration 4, as illustrated in FIG. 8, one initiator port (A1) is connected to one PCIe switch device (15A1). Hence, the storage controller 10A decides on each of the eight initiator ports A1, B1, C1, D1, E1, F1, G1, and H1 as the issue ports. The storage controller 10A updates the "issue flag" to "1" for each of the initiator ports A1, B1, C1, D1, E1, F1, G1, and H1." As a result, the fourth product number storage table 113A illustrated in FIG. 4 is constructed.

Next, the steps S303 and S304 of FIG. 3 is performed: Specifically, the configuration change command is issued from the issue port, and the setting in accordance with this configuration change command (setting for the PCIe switch device 15A) is performed.

In the step S303, the storage controller 10A transmits an attribute change command, which is a configuration change command for port attribute change, from the issue port. The attribute change command is a command requesting that the port attribute of the SW port connected to the issue port (the SW port that has received this attribute change command) be defined as "upstream," in other words, requesting that this SW port be defined as "USP." The PCIe switch device 15A, in response to the attribute change command, defines the SW port that has received the attribute change command as USP and returns an attribute change completion response to the storage controller 10. An SW port that does not receive the attribute change command is a DSP. Amongst the SW ports that do not receive the attribute change command, the port attribute of a particular SW port is defined as "Disable." In addition, for each SW port, the information indicative of the port attribute is stored in a configuration management table 17A of the PCIe switch device 15A.

In the step S304, the storage controller 10A transmits a partition change command, which is a configuration change command for partition change (setting), from the issue port. The PCIe switch device 15A, in response to the partition change command, sets the partition to which the SW port (USP) that has received the partition change command pertains and returns a partition change completion response to the storage controller 10. For each SW port, the information indicative of the partition to which this SW port pertains (e.g., partition number) is stored in the configuration management table 17A of the PCIe switch device 15A. The partition change completion response may include information indicative of the switch setting after the partition change (setting) (e.g., information indicative of the port attribute and partition number for each SW port).

By the steps S303 and S304, settings of the port attribute and partition are performed in accordance with the system configuration that has been determined. The port attribute and the partition configuration illustrated in FIG. 5 to FIG. 8 are the examples of the result of the steps S303 and S304.

Subsequently, the storage controller 10A checks whether or not the switch setting information indicates the port attribute and partition that have been changed (or set) as specified by the command in the steps S303 and S304 (S305). In other words, it is checked whether or not the switch settings are correctly performed. The "switch setting information" is a piece of information indicative of the switch configuration (switch setting) after the steps S303 and S304, specifically, for example, information indicative of the port attribute and partition number for each SW port. The switch setting information is a piece of information received from the PCIe switch device connected to the issue port. The switch setting information may be included in the partition change completion response or may be a piece of information received in response to a query that has been issued from the issue port to the PCIe switch device 15 in the step S305. In any case, the switch setting information that has been acquired is stored in the switch setting management table 114A and the above-described checking may be performed by referring to the switch setting management table 114A. If the result of the check is affirmative, then the system construction process may be completed. If the result of the check is negative, a predetermined error process may be executed.

The flow of the system construction process has been described above. In each of the steps S303 and S304, the configuration change command is issued, but the steps S303 and S304 may be integrated into one single step. Specifically, one configuration change command may be provided to perform the port attribute change and the partition setting.

The system construction process is carried out every time the modification of the system configuration (e.g., addition or deletion of PDEV boxes 121) is detected by the storage controller 10. As a result, the port attribute and partition suited to the system configuration after the modification is specified every time the system configuration is modified.

Given the embodiment that has been described in the foregoing, the descriptions and illustrations thereof can be summarized as follows. It should be noted, however, that the following synopsis may include matters that are not found in the above descriptions and illustrations and to the contrary may omit the matters found in the above descriptions and illustrations.

According to a system configuration having a relatively small number of PDEV boxes 121, a space-saving and high-performance storage system 110 can be expected. Specifically, for example, since a relatively small number of PDEV boxes 121 are involved, space saving can be expected. Since a relatively large number of initiator ports are connected to one PDEV box 121, high performance can be expected.

On the other hand, according to a system configuration having a relatively large number of PDEV boxes 121, a storage system 110 having at least either of enhanced redundancy and enlarged capacity can be expected. Specifically, for example, since a relatively large number of PDEV boxes 121 are involved, a relatively large number of PDEVs 2 will also be involved and consequently enlarged capacity can be expected. By configuring a RAID group based on a plurality of PDEVs 2 residing in different PDEV boxes 121, even when a failure occurs in any one of the PDEV boxes 121, it can be expected that data can be restored from two or more PDEVs 2 in the other PDEV boxes 121 and, as a result, enhanced redundancy can be expected.

Such multiple system configurations can be achieved by PCIe switches having the same hardware configuration. Specifically, the storage controller 10 acquires the product number (address) of the PDEV box 121 from each initiator port 3 and determines the system configuration on the basis of the identity/difference relationship of the multiple product numbers each corresponding to multiple initiator ports and sets the port attribute and partition corresponding to the system configuration that has been determined for each PCIe switch device 15. As a result, the hardware configuration of the PCIe switch device does not need to be prepared for each system configuration of the storage system. In other words, the PCIe switch device 15 of the same hardware configuration can support multiple system configurations. That is, the PCIe switch device 15 is a versatile PCIe switch device.

In addition, according to this embodiment, users (e.g., end users or maintenance personnel) can do their work in accordance with a procedure similar to those in commonly used storage systems. Specifically, in the case of a commonly used storage system, a user interconnects a controller box and a PDEV box by a cable and turns on the power source so as to construct a predefined system configuration. As a result, initialization is started in the storage system and the storage system is placed in an operational state. While the storage system 110 according to this embodiment implements different multiple system configurations by the same PCIe switch device 15, what is needed to construct a desired system configuration is to interconnect the controller box 111 and the PDEV box 121 by a cable and turn on the power source.

In addition, according to this embodiment, by changing the setting of the PCIe switch device 15 while the system is running, various system configurations can be constructed.

For example, the PDEV box 121B may be additionally provided while the PDEV box 121A is operating, in which case the storage controller 10A may identify a PDEV 2A that is not operating among the PDEV boxes 121A that are operating and configure one RAID group by the not-operating PDEV 2A that has been identified and at least one PDEV 2B of the PDEV box 121B.

In addition, the PCIe standard allows one root complex (RC) to exist in one domain and also has an upper limit on the number of endpoints (EPs) that can be connected to one domain. A storage system which requires many EPs (PDEVs) will be subject to the constraint that EPs by the number permissible per domain is not sufficient. Hence, as in this embodiment, it will be of great utility that the system configuration of the storage system can be flexibly modified. In addition, as described above, the user-friendliness will not be compromised while the system configuration is allowed to be flexibly modified.

Further, in general, new hardware is used to improve performance. However, improvement in the performance can be expected in this embodiment using commonly used constituent components of a storage box and a PDEV box. For example, when a configuration Q (where Q=any integer of 1 to 3, and Q<P) is adopted in place of a configuration P (where P=any integer of 2 to 4), improvement in the performance can be expected. Meanwhile, when the configuration P is adopted in place of the configuration Q, at least either of improvement in redundancy and increase in capacity can be expected.

Although one embodiment has been described above, this is an example for explaining the present invention, and the scope of the present invention is not limited to this embodiment. The present invention can be implemented in other various forms.

For example, the PDEV box 121 is an example of the storage device unit having a PDEV 2 and a PCIe switch device 15 connected to the PDEV 2. The controller box 111 is an example of the controller unit having a plurality of initiator ports 3 and a storage controller 10 having the initiator ports 3. At least one of the PDEV 2, the PCIe switch device 15, and the storage controller 10 does not need to be accommodated in a closed space such as a box.

In addition, for example, the present invention can also be implemented in a case where a switch device of any other type that relays communications in accordance with a communication interface that specifies the number of the master devices that can exist in the same domain is adopted in place of the PCIe switch device.

In addition, while each of the multiple PDEV boxes 121 is connected to one controller box 111 in the above-described embodiment, only the first PDEV box 121 out of multiple cascaded PDEV boxes 121 may alternatively be connected to one controller box 111. In the former case, the PCIe switch device 15 is directly connected (without any intervening PCIe switch device 15) to each of the initiator ports 3 and, in the latter case, the PCIe switch device 15 is indirectly connected (via another PCIe switch device 15) to at least one initiator port 3.

REFERENCE SIGNS LIST

110: storage system

The invention claimed is:

1. A storage system comprising:
one or more storage device units; and
a controller unit,
wherein the controller unit includes:
a plurality of initiator ports, and
a storage controller connected to the initiator ports,
wherein each of the one or more storage device units includes:
one or more storage devices, and
a switch device having a plurality of switch ports including one or more switch ports each connected to the one or more storage devices and one or more switch ports each connected to the initiator ports, and configured to relay communications in accordance with a communication interface, the communication interface specifying a number of master devices allowed to exist in a same domain,
wherein the one or more storage device units are connected, via the switch ports of the switch device thereof, to the initiator ports, and
wherein the storage controller is programmed to execute a system construction process including:
acquiring, via each of the plurality of initiator ports, an ID of a respective storage device unit, of the one or more storage device units, connected to a corresponding one of the initiator ports;
determining a system configuration based on a port ID relationship representing a relationship between the plurality of initiator ports and a plurality of the IDs acquired via each of the plurality of initiator ports;
determining, for each of the one or more storage device units, a respective issue port among the initiator ports connected to a same corresponding one of the one or more storage device units in accordance with the determined system configuration; and
performing switch setting, for each of the one or more storage device units, in accordance with the determined system configuration by transmitting a respective configuration change command via the respective issue port.

2. The storage system according to claim 1, wherein the respective configuration command transmitted via the respective issue port includes:
a respective attribute change command to define the plurality of switch ports according to the one of the switch ports connected to the respective issue port, and
a respective partition change command to set a respective domain of the one of the switch ports connected to the respective issue port.

3. The storage system according to claim 2, wherein the system construction process further includes:
checking, for each of the one or more storage device units, whether or not setting in accordance with the respective configuration change command has been made on the switch device thereof.

4. The storage system according to claim 1, wherein the storage controller is programmed to start the system construction process when a power source is turned on.

5. The storage system according to claim 1, wherein the storage controller is programmed to start the system construction process when addition or deletion of a storage device unit is detected.

6. The storage system according to claim 5, wherein the storage controller is programmed to construct a RAID group including a storage device that is not running in a storage device unit before the addition and at least one storage device in a storage device unit that has been added in a system construction process started when addition of the storage device unit is detected.

7. The storage system according to claim 1, wherein the communication interface is PCI-Express (PCIe).

8. A system constructing method for a storage system including one or more storage device units and a controller unit,
wherein the controller unit includes:
a plurality of initiator ports, and
a storage controller connected to the initiator ports,
wherein each of the one or more storage device units includes:
one or more storage devices, and
a switch device having a plurality of switch ports including one or more switch ports each connected to the one or more storage devices and one or more switch ports each connected to the initiator ports, and configured to relay communications in accordance with a communication interface, the communication interface specifying a number of master devices allowed to exist in a same domain,
wherein the one or more storage device units are connected, via the switch ports of the switch device thereof, to the initiator ports, and
the system configuration method comprising:
acquiring, via each of the plurality of initiator ports, an ID of a respective storage device unit, of the one or more storage device units, connected to a corresponding one of the initiator ports;
determining a system configuration based on a port ID relationship representing a relationship between the plurality of initiator ports and a plurality of the IDs that have been acquired via each of the plurality of initiator ports;
determining, for each of the one or more storage device units, a respective issue port among the initiator ports connected to a same corresponding one of the one or more storage device units in accordance with the determined system configuration; and
performing switch setting, for each of the one or more storage device units, in accordance with the determined system configuration by transmitting a respective configuration change command via the respective issue port.

* * * * *